V. T. KELLAR.
COVER FOR WHEEL TIRES.
APPLICATION FILED FEB. 9, 1914.
1,134,748. Patented Apr. 6, 1915.
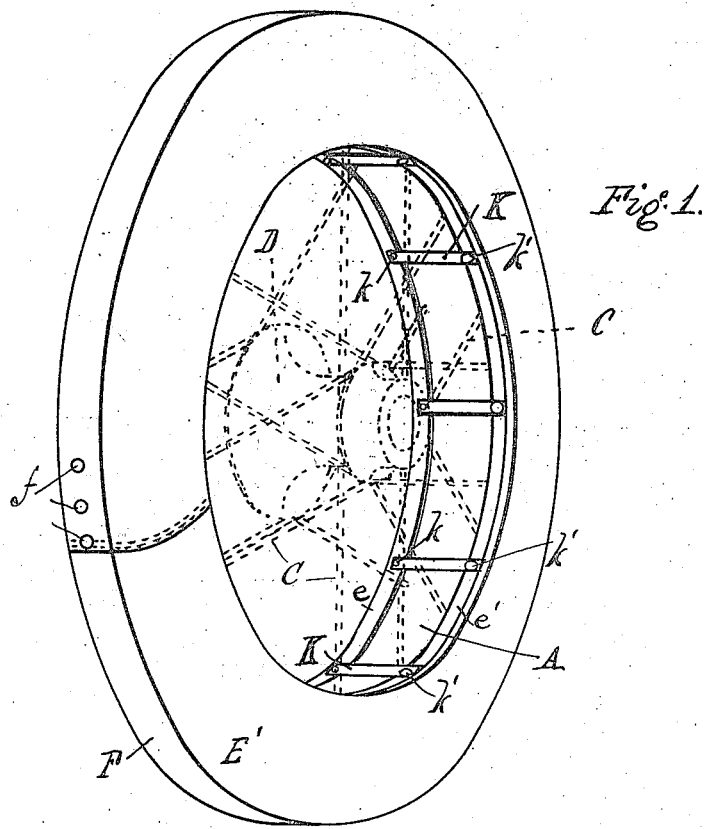
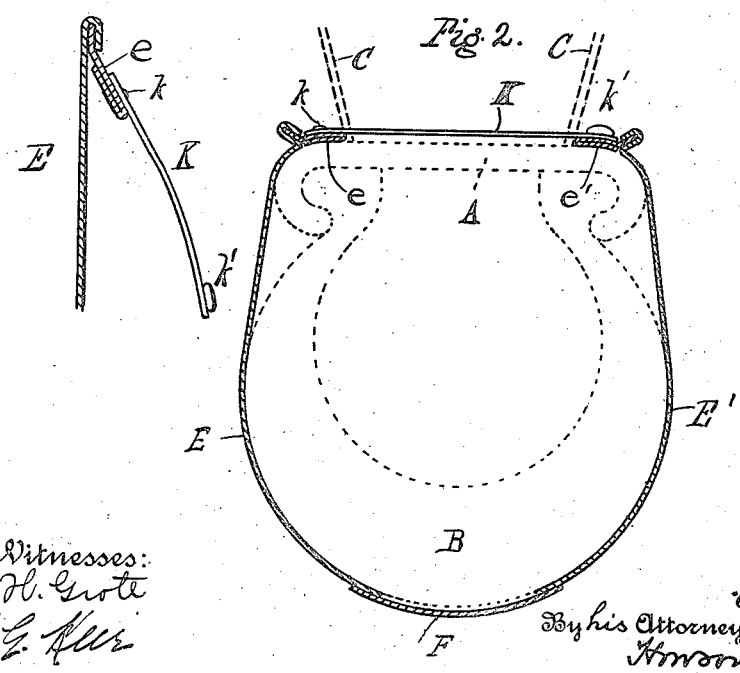
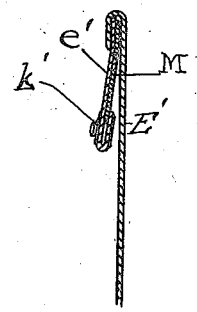
Witnesses:
L. H. Grote
M. G. Kerr
Inventor
Victor T. Kellar
By his Attorneys
Howson and Howson

UNITED STATES PATENT OFFICE.

VICTOR T. KELLAR, OF NEW YORK, N. Y., ASSIGNOR TO THE ALLEN AUTO SPECIALTY COMPANY, OF NEW YORK, N. Y., A CORPORATION OF NEW YORK.

COVER FOR WHEEL-TIRES.

1,134,748.

Specification of Letters Patent.

Patented Apr. 6, 1915.

Application filed February 9, 1914. Serial No. 817,627.

*To all whom it may concern:*

Be it known that I, VICTOR T. KELLAR, a citizen of the United States of America, and residing in the borough of Manhattan, in the city, county, and State of New York, have invented a certain new and useful Improvement in Covers for Wheel-Tires, of which the following is a specification.

The object of my invention is to provide a simple, convenient and efficient cover for the tires of spare wheels for automobiles.

It has long been common to provide covers for the spare tires of automobile wheels, usually when removed from the wheel rim, although in some cases, covers have been provided to inclose the demounted rims as well as the tires thereon.

My present invention, however, consists of a cover which is adapted for use upon a complete spare wheel having hub and spokes permanently secured to the rim. It is especially useful with what are known as wire wheels, that is, wheels having spokes of wire. With such a wheel the ordinary form of cover cannot be used, because the wheel spokes would interfere with the inner flaps.

In the accompanying drawing, Figure 1 is a perspective view of a wire wheel provided with my improved cover; Fig. 2 is an enlarged cross-sectional view of the cover in place on a wheel rim and tire thereon, indicated by dotted lines; Fig. 3 is a cross section through a portion of the cover; and Fig. 4 is a similar view through a modified form of construction.

A indicates the rim, B the tire, C the wire spokes and D the hub of a wire wheel.

The cover is of waterproofing flexible material, as usual, and its main part comprises two side strips E, $E^1$, united by a tread strip F to form a trough shaped piece to be drawn lengthwise around the periphery of the wheel tire and to have its ends overlapped and secured by snap fastenings $f$, Fig. 1, in a manner commonly employed in tire covers for separate spare tires. The inner edges of the side pieces E, $E^1$ are provided with inwardly projecting or reëntrant flanges $e, e^1$, narrow in width, but of the full length of the side strips. These flanges may conveniently be formed of separate strips of material stitched under the folded edges of the side pieces, but in any case, these flanges when the cover is off the tire will tend to fold against their respective side pieces E, $E^1$. To the flange $e$ on one side I secure at intervals as by rivets $k$ cross straps K. The opposite end of each strap carries one member of a snap fastening $k^1$, the other member of which is carried by the flange $e^1$ on the side piece $E^1$. When the cover is put upon the tire on the wheel, these cross straps are passed through the spaces between the wire spokes and when the opposite side pieces E and $E^1$ are drawn tight up around the wheel and rim, the free ends of the straps K are secured by the snap fastenings $k^1$. The result is to draw the inner edges of the flanges $e, e^1$, tight down onto the inner face of the wheel rim, so that they will hug the latter and make a tight joint all the way round.

In the modification shown in Fig. 4 I have shown a flange reinforced to insure a perfectly water tight joint with the rim. This reinforcement may be of any suitable character, preferably of flexible semi-rigid material such as celluloid or whale bone M arranged at the inner edge of the flange. As the straps K are pulled tight and fastened, this resilient stiffening material presses the flap firmly against the inner face of the rim thus insuring a very tight fit or joint therewith, which is sufficient under all ordinary conditions, to exclude rain, dust, etc., from the interior of the casing.

Various other modifications of the constructions which embody my invention will readily suggest themselves.

I claim as my invention:—

1. A tire cover for spare wheels comprising an annular trough-like casing with telescoped ends in adjusted position, said cover having a tread strip adapted to overlie the tire tread, side strips secured on both sides of the tread strip and adapted to embrace the sides of the tire, continuous marginal flanges attached to said side strips and extending the length of the cover and adapted to overlie the inner periphery of the wheel rim outside the spoke area, and means extending between the wheel spokes for drawing the free edges of said flanges into continuous and uninterrupted close engagement with the inner periphery of the wheel rim to exclude dirt and water from the tire.

2. A tire cover for spare wheels comprising an annular trough-like casing adapted to envelop the tread and sides of a wheel tire, the ends of the casing being telescoped in adjusted position, fastening means for securing said telescoped ends together, reëntrant marginal flaps on the inner peripheral edges of the opposite sides of said cover, and means passing between the spokes and spaced about the open inner periphery of the cover for drawing said marginal flaps in expanded position into close engagement with the wheel rim, substantially as described.

3. A tire cover for spare wheels comprising an annular trough-like casing adapted to envelop the tread and sides of a wheel tire, the ends of the casing being telescoped in adjusted position, fastening means for securing said telescoped ends together reëntrant marginal flaps on the inner peripheral edges of the opposite sides of said cover, and means passing between the spokes and spaced about the open inner periphery of the cover for drawing said marginal flaps in expanded position into close engagement with the wheel rim, together with resilient reinforced means in said flaps serving in the adjusted position of the cover to add pressure to the engagement between said flaps and the wheel rim, for the purpose described.

4. A tire cover for spare wheels comprising an' annular, trough-like casing adapted to envelop the tread and sides of a wheel tire, the ends of the casing being telescoped in adjusted position, reëntrant marginal flaps on the inner peripheral edges of the opposite sides of the cover, and means secured to the outer faces of said marginal flaps and passing between the wheel spokes and spaced apart about the inner periphery of the cover and serving to draw the free edges of said marginal flaps into continuous close engagement with the inner periphery of the wheel rim.

In testimony whereof I have signed my name to this specification, in the presence of two subscribing witnesses.

VICTOR T. KELLAR.

Witnesses:
GEORGE A. OVENS,
S. V. MAHON.